(12) United States Patent
Mori

(10) Patent No.: US 7,252,874 B2
(45) Date of Patent: Aug. 7, 2007

(54) HEAT-SENSITIVE STENCIL, METHOD OF PREPARING STENCIL PRINTING MASTER AND STENCIL PRINTER

(75) Inventor: Tomiya Mori, Miyagi-ken (JP)

(73) Assignee: Tohoku Ricoh Company, Ltd., Miyagi-Ken (JP)

( * ) Notice: Subject to any disclaimer, the term of this patent is extended or adjusted under 35 U.S.C. 154(b) by 897 days.

(21) Appl. No.: 09/945,764

(22) Filed: Sep. 4, 2001

(65) Prior Publication Data

US 2003/0129381 A1    Jul. 10, 2003

(51) Int. Cl.
- B32B 3/26 (2006.01)
- B32B 7/02 (2006.01)
- B32B 3/00 (2006.01)
- B32B 27/12 (2006.01)
- B41N 1/24 (2006.01)

(52) U.S. Cl. ............... 428/304.4; 428/215; 428/314.2; 428/317.9; 428/319.7; 427/143; 427/208.8; 442/287; 442/395

(58) Field of Classification Search ............ 428/304.4, 428/215, 317.9, 314.2, 319.7; 427/208.8, 427/143; 442/287, 395
See application file for complete search history.

(56) References Cited

U.S. PATENT DOCUMENTS

| | | | | |
|---|---|---|---|---|
| 3,934,503 A | * | 1/1976 | Kinney et al. | ........... 101/128.2 |
| 5,843,560 A | | 12/1998 | Ohta et al. | |
| 5,888,653 A | * | 3/1999 | Kawatsu et al. | ........... 428/409 |
| 5,908,687 A | | 6/1999 | Mori | |
| 6,025,286 A | * | 2/2000 | Kawatsu et al. | ........... 442/287 |
| 6,096,374 A | | 8/2000 | Ohta et al. | |

FOREIGN PATENT DOCUMENTS

| | | |
|---|---|---|
| JP | 10-24667 | 1/1998 |
| JP | 10147075 | 6/1998 |
| JP | 10236011 | 9/1998 |
| JP | 2000171252 | 6/2001 |

OTHER PUBLICATIONS

English translation of JP 10-147075.*
U.S. Appl. No. 09/204,603, filed Dec. 3, 1998.
U.S. Appl. No. 09/679,747, filed Jan. 5, 2000.

* cited by examiner

Primary Examiner—Victor S. Chang
(74) Attorney, Agent, or Firm—Cooper & Dunham LLP

(57) ABSTRACT

A heat-sensitive stencil including a thermoplastic resin film on which a porous resin layer and a porous reinforcing layer are formed in succession. A porous fibrous layer may be disposed between the porous resin layer and the porous reinforcing layer.

19 Claims, 2 Drawing Sheets

HEAT-SENSITIVE STENCIL, METHOD OF PREPARING STENCIL PRINTING MASTER AND STENCIL PRINTER

BACKGROUND OF THE INVENTION

This invention relates to a heat-sensitive stencil, to a method of preparing a stencil printing master and to a stencil printer using the heat-sensitive stencil.

One known heat-sensitive stencil is composed of an ink-permeable thin paper serving as an ink port and a thermoplastic resin film bonded with an adhesive to the port. The stencil is heated imagewise by, for example, a thermal head to perforate the heated portions of the thermoplastic resin film, thereby obtaining a printing master for reproducing images by mimeographic printing. The conventional stencil, however, poses problems because (1) the adhesive tends to be accumulated in interstices between fibers to form "fins" which prevent the thermal perforation during the master forming step and the passage of an ink during the printing step, (2) the fibers per se prevent smooth passage of an ink and (3) the paper port is relatively expensive.

To cope with the above problems, JP-A-54-33117 proposes a stencil having no paper port and composed substantially only of a thermoplastic resin film. While this stencil can completely solve the above-mentioned problems, a new serious problem arises; i.e. it is necessary to significantly increase the thickness of the stencil in order to obtain satisfactory stiffness required for transferring the stencil master during printing stage. An increase of the thickness results in the lowering of the thermal sensitivity.

U.S. Pat. No. 5,843,560 discloses a heat-sensitive stencil having a porous resin layer formed on a thermoplastic resin film. This stencil has been found to be able to solve the above-described problems but to cause a problem because of insufficient tensile strength.

JP-A-H10-147075 discloses a heat-sensitive stencil having a porous fibrous layer over a surface of a porous resin layer. The fibrous layer has been found to improve the tensile strength of the stencil but to adversely affect the print image quality.

SUMMARY OF THE INVENTION

It is an object of the present invention to provide a heat-sensitive stencil which has a high stiffness, a high tensile strength and gives a high quality print.

Another object of the present invention is to provide a heat-sensitive stencil of the above-mentioned type which can exhibit a high resistance to inter-layer delamination.

In accomplishing the foregoing objects, there is provided in accordance with one aspect of the present invention a heat-sensitive stencil comprising:
a thermoplastic resin film,
a porous resin layer provided on said thermoplastic resin film, and
one or more porous reinforcing layers provided on said porous resin layer.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
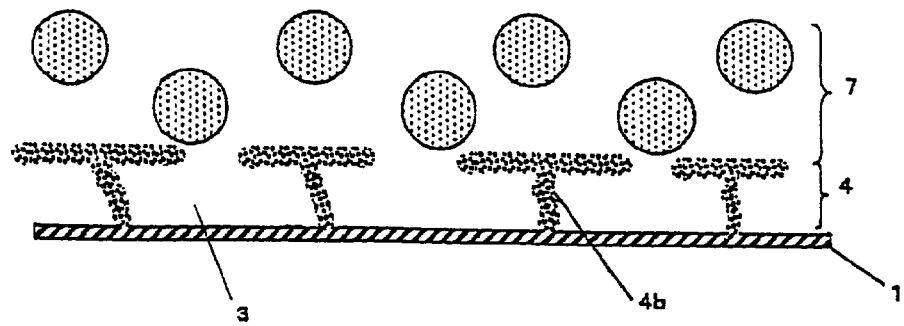
FIG. 1 is a sectional view schematically illustrating one embodiment of a heat-sensitive stencil according to the present invention.

FIG. 1 is a sectional view schematically illustrating one embodiment of a stencil according to the present invention. Designated as 1 is an ink impermeable thermoplastic resin film on which an ink permeable, porous resin layer 4 and an ink permeable, porous reinforcing layer 7 are provided in succession in this order.

Any thermoplastic resin conventionally used in heat-sensitive stencil master may be used for the film 1. Illustrative of suitable thermoplastic resins are vinyl chloride-vinylidene chloride copolymers, polypropylene and polyesters. A polyester film having melting energy of 3-11 cal/g (JP-A-62-149496), a polyester film having a degree of crystallization of 30% or less (JP-A-62-282983) and a polyester film containing at least 50 mol % of butylene terephthalate units (JP-A-2-158391) are particularly preferred because they permit perforation with a low energy. The thermoplastic resin film 1 preferably has a thickness of 0.5-10 µm, more preferably 1-7 µm for reasons of easiness in formation of the porous resin layer 4 thereon and in formation of perforations.

The resin film 1 may contain one or more additives such as a flame retardant, a heat stabilizing agent, anti-oxidation agent, a UV absorbing agent, a pigment, an extender, a filler, a dye, an organic lubricant, an anti-foaming agent and a slippage improving agent, if desired. The lubricant may be a fatty acid ester or a wax. The slippage improving agent may be inorganic particles, such as clay, mica, titanium oxide, calcium carbonate, kaolin, talc or wet or dry silica, or organic particles, such as particles of polymers having acrylic acid or styrene units. The pigment (or filler) may be, for example, barytes, barium sulfate, barium carbonate, calcium carbonate, kaolin, clay, silica, hydrated silica, talc, basic magnesium carbonate, alumina white, basic lead carbonate, basic lead sulfate, lead sulfate, zinc sulfate and titanium oxide, potassium titanate, potassium borate or titanium oxide. The pigment in the form of whiskers is suitably used.

If desired, the thermoplastic resin layer 1 may be backed by a stick preventing layer (not shown) containing a stick preventing agent such as a silicone mold release agent, a fluorine resin mold release agent or a phosphoric ester surfactant.

Figure 2:
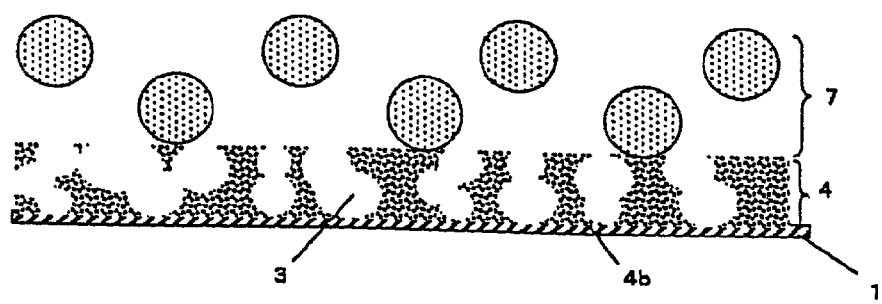
FIGS. 2 and 3 are sectional views, similar to FIG. 1, schematically illustrating other embodiments of heat-sensitive stencils according to the present invention.
Figure 3:
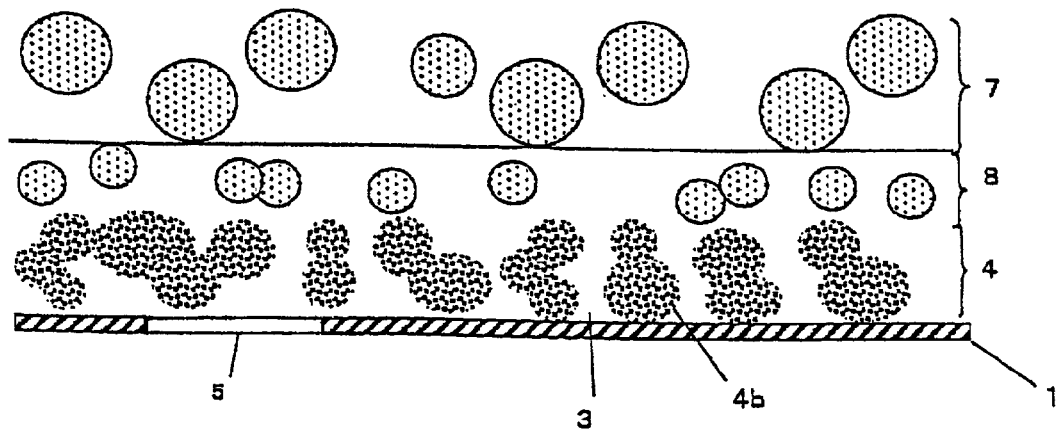
Figure 4:
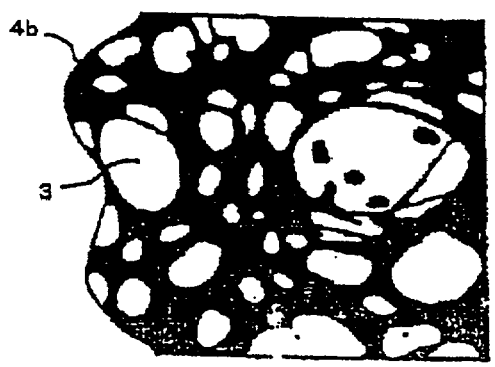
FIG. 4 is an enlarged view schematically illustrating openings in a surface of a heat-sensitive stencil.

The porous resin layer 4, which is non-fibrous, is formed from a solvent solution of a resin by, for example, a method described in U.S. Pat. No. 5,843,560, the disclosure of which, including the specification, claims and drawings, is hereby incorporated by reference herein. The porous resin layer 4 has a multiplicity pores 3 defined by resin walls 4b. The shape of the pores 3 is not specifically limited and may be as schematically illustrated in FIGS. 1-3. Thus, the pores 3 may be defined by resin walls 4b which are in the form of, for example, columns, spheres, plates of varying shapes. The structure of pores 3 may vary according to the method and condition of preparation of the porous resin layer 4, such as kind of the resin, concentration of the resin solution, kind of the solvent, amount of the resin solution applied, drying temperature, applying temperature and humidity.

Each pore of the porous resin layer 4 preferably opens at a surface of the porous resin layer opposite the thermoplastic resin film 1 for reasons of proper ink permeability through the porous resin layer 4. However, this is not essential. Since a heat-sensitive stencil ink is generally of a water in oil emulsion, closed cells may be broken upon contact with the ink. A mechanical or chemical treatment may be adopted, if necessary, to break closed cells of the porous resin layer 4.

The porous resin layer 4 preferably has an average pore diameter of 1-50 μm, more preferably 2-30 μm, for reasons of proper ink permeability. The average pore diameter may be measured from an electron microphotograph (magnification: 1,000) of the surface of the porous resin layer 4. The photograph is processed by an image processor (LA-555D manufactured by Pierce Inc.) for determining the diameter of the circle corresponding to the opening.

It is preferred that the total area of the openings of the porous resin layer 4 having an equivalent diameter of at least 5 μm be 4-80%, more preferably 10-60%, of a total area S of the surface of the porous resin layer 4 for reasons of proper ink passage therethrough and proper capability of the formation of perforations. The term "openings" herein refers to pores 3 exposed to a surface of the layer 4 and the term "equivalent diameter" refers to a diameter of a circle having the same area as that of the corresponding "opening". The total area of the openings may be measured from an electron microphotograph (magnification: 1,000) of the surface of the porous resin layer 4. The photograph is processed by an image processor (LA-555D manufactured by Pierce Inc.) for determining the diameter of the circle corresponding to the opening.

It is also preferred that the total area of the openings having an equivalent diameter of at least 5 μm, be at least 50%, more preferably at least 70%, of a total area of the openings for reasons of proper ink passage therethrough and proper capability of the formation of perforations.

The porous resin layer 4 preferably has a thickness of 5-100 μm, more preferably 6-50 μm, for reasons of proper stiffness of the stencil and proper ink transference. The density of the porous resin layer 4 is preferably 0.01-1 g/cm$^3$, more preferably 0.1-0.5 g/cm$^3$, for reasons of proper stiffness and mechanical strengths. It is also desirous that the thickness of the porous resin layer 4 be uniform.

For reasons of proper transferability of the printing master in the printer, it is preferred that the stencil have a flexural rigidity of at least 5 mN, when measured with a Lorentzen Stiffness Tester.

For reasons of obtaining good print quality, the heat-sensitive stencil according to the present invention preferably shows an air permeability in the range of 1.0 cm$^3$/cm$^2$·sec to 157 cm$^3$/cm$^2$·sec in a portion thereof when the thermoplastic resin film of that portion is perforated to form perforations providing an open ratio SO/SP of at least 0.2, wherein SO represents a total area of the perforations and SP represents the area of the portion. The air permeability of a printing master represents the ink permeability thereof. Thus, an air permeability of a printing master of below 1.0 cm$^3$/cm$^2$·sec means that the porous resin layer has a low porosity and that the master has low ink permeability. On the other hand, an air permeability in excess of 157 cm$^3$/cm$^2$·sec means that the porous resin layer has low ink retentivity and that stains and blurs may be caused.

The air permeability may be measured in the following manner. A square solid pattern (black pattern) with a size of 10×10 cm is read by a printer (PRIPORT VT 3820 manufactured by Ricoh Company, Ltd.) and a sample stencil is perforated with a thermal head in accordance with the read out pattern to form a printing master. The perforation operations are performed for five similar samples so that five printing masters having open ratios SO/SP of about 0.2, 0.35, 0.50, 0.65 and 0.80 are obtained. The open ratio of a master may be measured by making a photomicrograph (magnification: 100) thereof. The photomicrograph is then magnification-copied (magnifying ratio: 200) using a copying machine (IMAGIO MF530 manufactured by Ricoh Company, Ltd.). Perforations shown in the copy are marked on an OHP film and then read by a scanner (300 DPI, 256 gradient). This is binarized with an image retouch software Adobe Photoshop 2.5 J. The open ratio of the perforations is measured using an image analysis software NIH IMAGE. The perforated portion of each of the printing masters is measured for the air permeability thereof by any conventional method. When at least one of the five masters has an air permeability in the range of 1.0 cm$^3$/cm$^2$·sec to 157 cm$^3$/cm$^2$·sec, the stencil is regarded as having the air permeability in the range of 1.0 cm$^3$/cm$^2$·sec to 157 cm$^3$/cm$^2$·sec.

In the state where the stencil has been processed by a thermal head to form perforations in the thermoplastic resin layer 1, it is preferred that part of the porous resin layer 4 in each of the perforations remain unremoved and cover the perforations. The remaining portion of the porous resin layer 4 serves to control the amount of ink transferred from the master to a paper during the mimeographic printing stage. Such remaining portion of the layer 4 can be formed by suitably adjusting the thickness of the layer 4.

Any resin may be used for the formation of the porous resin layer 4. Illustrative of suitable resins of the porous resin layer 4 are vinyl resins such as poly(vinyl chloride), poly(vinyl butyral), vinyl chloride-vinyl acetate copolymer, vinyl chloride-vinylidene chloride copolymer or vinyl chloride-acrylonitrile copolymer; polyamide such as nylon; polyolefins such as polyethylene, polypropylene, polybutene and polybutylene; polyphenylene oxide; (meth)acrylic ester; polycarbonate; cellulose derivatives such as acetylcellulose, acetylbutylcellulose or acetylpropylcellulose; polyesters; polyacetal; fluorine resins; polyurethane; natural rubber; thermoplastic elastomers; biodegradable plastics; fatty acids; waxes; proteins; carbohydrates; copolymers thereof and mixtures thereof. It is preferred that the porous resin layer 4 contain a resin capable of softening at such a temperature that the perforation by a thermal head is carried out, generally at a temperature of 150° C. or less, for reasons of facilitating the perforation of the thermoplastic resin film 1.

The porous resin layer may contain one or more additives such as a filler, an antistatic agent, a stick-preventing agent, a surfactant, an antiseptic agent and an antifoaming agent. Addition of a filler including pigments, particles, powder and fibers to the porous resin layer is desirable to control the strength, stiffness and the size of pores thereof. Use of a filler in the form of needles, fibers or plates is particularly preferred. Illustrative of suitable fillers are needle-like natural mineral fillers such as magnesium silicate, sepiolite, potassium titanate, wollastonite, zonolite and gypsum fiber; needle-like synthetic mineral fillers such as non-oxide-type needle whiskers, oxide whiskers and mixed oxide whiskers;

platy fillers such as mica, glass flakes and talc; natural or synthetic fibers such as carbon fiber, polyester fiber, glass fiber, vinylon fiber, nylon fiber and acrylic fiber; and pigments such as organic polymer particles of, for example, poly(vinyl chloride) particles, poly(vinyl acetate) particles and polymethyl acrylate particles, and inorganic particles of, for example, carbon black, zinc oxide, titania, calcium carbonate and silica and microcapsules (e.g. Matsumoto Microsphere). The filler is generally used in an amount of 5-200% based on the weight of the resin of the porous resin layer.

One preferred method of fabricating the above porous resin layer 4 will be next described. A resin for forming the porous resin layer 4 is first dissolved in a mixed solvent including a first solvent (good solvent) capable of dissolving the resin and a second solvent (poor solvent) substantially incapable of dissolving the resin and having a lower evaporation rate than the first solvent, thereby to obtain a coating liquid in the form of a solution. Preferably the second solvent has a boiling point which is higher by 15-40° C. than that of the first solvent and which is preferably 100° C. or less. Two or more good solvents and/or two or more poor solvents may be used in combination, if desired. As the proportion of the poor solvent increases, the size of the pores 3 of the resulting porous resin layer 4 tends to increase. The mixing ratio of the poor solvent to the good solvent may be determined in consideration of the desired pore size.

The thus obtained coating liquid is then applied over a surface of a thermoplastic resin film 1 to form a wet resin coating. The application of the coating liquid may be carried out by any desired coating method such as blade coating, transfer roll coating, wire bar coating, reverse roll coating or gravure coating. The wet resin coating is then heated at a temperature below the boiling point of the second solvent but sufficient to vaporize part of the first solvent so that a portion of the resin precipitates. Subsequently, the coating is further heated preferably at 60° C. or less until the coating is completely dried. During the course of the vaporization of the solvents, there are formed a multiplicity of pores.

Examples of suitable poor and good solvents are shown in Table 1 below. As shown, good and poor solvents vary with the resin to be dissolved.

TABLE 1

| Solvent (b.p. ° C.) | Resin | | | | | |
|---|---|---|---|---|---|---|
| | PVC*1 | VCA*2 | PB*3 | PS*4 | ANS*5 | ABS*6 |
| Methanol (64.5) | poor | poor | poor | poor | poor | poor |
| Ethanol (78.3) | poor | poor | poor | — | — | poor |
| Ethyl acetate (77.1) | — | good | poor | good | good | — |
| Acetone (56.1) | good | good | poor | good | good | good |
| Methyl ethyl ketone (79.6) | good | good | poor | good | good | good |
| Diethyl ether (34.5) | poor | — | — | poor | poor | poor |
| Tetrahydrofuran (65–67) | good | good | good | good | — | — |
| Hexane (68.7) | poor | poor | good | poor | poor | — |
| Heptane (98.4) | poor | poor | poor | poor | poor | poor |
| Benzene (80.1) | — | poor | good | good | good | good |
| Toluene (110.6) | — | good | good | good | good | good |
| Xylene (139.1) | — | good | good | good | good | good |
| Chloroform (61.2) | — | good | good | good | good | good |
| Carbon tetrachloride (76.7) | — | good | good | good | — | — |
| Water (100.0) | poor | poor | poor | poor | poor | poor |

TABLE 1-continued

| Solvent (b.p. ° C.) | Resin | | | | | |
|---|---|---|---|---|---|---|
| | MAR*7 | PVA*8 | PC*9 | AC*10 | AR*11 | VB*12 |
| Methanol (64.5) | — | good | poor | — | poor | good |
| Ethanol (78.3) | — | poor | poor | — | poor | good |
| Ethyl acetate (77.1) | good | good | poor | good | good | good |
| Acetone (56.1) | good | good | poor | good | good | good |
| Methyl ethyl ketone (79.6) | good | good | poor | good | — | good |
| Diethyl ether (34.5) | — | poor | — | — | — | poor |
| Tetrahydrofuran (65–67) | good | — | good | good | — | good |
| Hexane (68.7) | poor | poor | poor | poor | poor | poor |
| Heptane (98.4) | poor | poor | poor | poor | poor | poor |
| Benzene (80.1) | good | good | good | — | good | poor |
| Toluene (110.6) | good | good | good | poor | good | poor |
| Xylene (139.1) | good | good | good | poor | good | — |
| Chloroform (61.2) | good | good | good | good | good | — |
| Carbon tetrachloride (76.7) | — | — | good | poor | — | — |
| Water (100.0) | poor | poor | poor | poor | poor | poor |

*1PVC: poly(vinyl chloride)
*2VCA: vinyl chloridevinyl acetate copolymer
*3PB: polybutylene
*4PS: polystyrene
*5ANS: acrylonitrilestyrene copolymer
*6ABS: acrylonitrilebutadiene-styrene copolymer
*7MAR: methacrylic acid resin
*8PVA: poly(vinyl acetate)
*9PC: polycarbonate
*10AC: acetylcellulose resin
*11AR: acrylate resin
*12VB: polyvinylbutyral In a second embodiment, the porous resin layer may be prepared as follows. First, a solution of a resin for the porous resin layer in a first solvent is prepared. The solution is applied over a surface of a thermoplastic resin film to form a wet resin coating over the surface. Then, vapors or fine droplets of a second solvent substantially incapable of dissolving the resin are sprayed over the wet resin coating so that the second solvent is taken into the wet resin coating to cause a portion of the resin to precipitate. Thereafter, the resin coating is heated to dryness to form a porous resin layer. The first and second solvents are similar to those described above. In the second embodiment, the size and number of pores may be controlled by the amount and particle size of the droplets of the second solvent. It is preferred that the thermoplastic resin film be previously applied with a spray of the second solvent before being applied with the solvent solution of the resin, since the contact area between the resulting porous resin layer and the thermoplastic resin film is decreased and, therefore, the stencil can be more easily perforated by a thermal head.

In a third embodiment, a solution of a resin for the porous resin layer in a first solvent is applied over a surface of a thermoplastic resin film to form a wet resin coating over the surface. While the coated film is confined in an atmosphere of a second poor solvent, the wet coating is heated to evaporate the first solvent. Because of the heat of evaporation, the temperature of the coating is lowered so that the vapors of the second solvent are condensed and taken into the coating. As a consequence, the resin precipitates to form porous resin layer. The solvent solution of the resin to be applied to the thermoplastic film may contain a small amount of the second, poor solvent so as to obtain uniform pores. If desired, two or more of the above first to third methods may be combined for the fabrication of the porous resin layer.

If desired, a stick preventing layer (overcoat layer) may be provided on a surface of the resin film for the purpose of preventing sticking between a thermal head and the stencil, so that the thermal head can smoothly run or slide on the stencil during perforation for producing a printing master from the stencil. The stick preventing layer may be a layer containing a silicone releasing agent, a fluorocarbon releasing agent or a phosphate surfactant.

Referring again to FIG. 1, an ink permeable, porous reinforcing layer 7 is provided on the porous resin layer 4. Two or more reinforcing layers may be laminated on the porous resin layer 4, if desired. The porous reinforcing layer 7 has a much higher tensile strength and a much higher stiffness than those of the porous resin layer 4. Yet, the reinforcing layer does not adversely affect the perforation efficiency. Therefore, the heat sensitive stencil of the present invention is very suited as a printing master for producing a great number of prints or as a full color printing master.

Any ink permeable layer may be used as the porous reinforcing layer 7, as long as it has a high tensile strength or a high stiffness. Generally, the porous reinforcing layer 7 has a tensile strength of at least 385 N/m, preferably 500-825 N/m. The stiffness of the porous reinforcing layer 7 is generally at least 42 mN, preferably 48-180 mN, in terms of flexural rigidity measured with a Lorentzen Stiffness Tester. The tensile strength herein refers to a force required for drawing a sample film with a width of 1 m so as to increase the length by 2%.

The porous reinforcing layer 7 may be, for example, a layer or layers of a mesh, screen or screen cloth material, such as meshes or screens of polyamide fibers, polyester fibers or metal fibers. Such a mesh, screen or screen cloth material preferably has a mesh size of 120-420 mesh for reasons of image quality. A layer or layers of a perforated plastic material may also be used as the reinforcing layer 7. Such a perforated plastic material may be prepared by printing such as gravure printing, offset printing or flexo printing or by coating such as spray coating or nozzle (e.g. slit) coating on a suitable support.

The porous reinforcing layer 7 may also be a woven fabric, a non-woven fabric, a thin paper produced by paper making or a layer obtained by peeling a dried coating obtained by applying a coating liquid containing fibers and a binder. The fibers may be, for example, a mineral fiber such as glass fiber, sepiolite fiber or metal fiber; an animal fiber such as wool or silk; a plant fiber such as cotton or hemp; a reclaimed fiber such as rayon or staple; a synthetic fiber such as polyester, polyvinyl alcohol or acrylate; a semi-synthetic fiber such as carbon fiber; or a mixed fiber thereof. The diameter of the fiber is generally at least 14 μm, preferably at least 21 μm, for reasons of proper tensile strength and proper ink passage through the reinforcing layer 7.

The reinforcing layer 7 may be laminated on the porous resin layer 4 with an adhesive. It is preferred that the amount and the viscosity of the adhesive applied to the porous resin layer 4 and/or reinforcing layer 7 be controlled so as to prevent the adhesive from entering the openings of the porous resin layer 4. When two or more porous reinforcing layers 7 are provided, it is preferred that the degree of openings or porosity become greater from inside to outside (from the innermost reinforcing layer to the outermost reinforcing layer) for reasons of ink permeability.

As shown in FIG. 3, a fibrous porous layer 8 may be interposed between the porous resin layer 4 and the porous reinforcing layer 7 (when two or more reinforcing layers 7 are present, the fibrous porous layer 8 is interposed between the lowermost reinforcing layer and the porous resin layer 4). Two or more fibrous porous layers may be provided if desired. Preferably, the fibrous porous layer 8 has smaller degree of openings or porosity than that of the porous reinforcing layer 7. When two or more fibrous porous layers 8 are provided, it is preferred that the degree of openings or porosity of the fibrous porous layers 8 become greater from inside to outside (from the innermost fibrous layer adjacent to the porous resin layer 4 to the outermost fibrous layer adjacent to the reinforcing layer 7) for reasons of ink permeability.

The fibrous porous layer 8 may be formed of a mineral fiber such as glass fiber, sepiolite fiber or metal fiber; an animal fiber such as wool or silk; a plant fiber such as cotton or hemp; a reclaimed fiber such as rayon or staple; a synthetic fiber such as polyester, polyvinyl alcohol or acrylate; a semi-synthetic fiber such as carbon fiber; mixed fiber thereof; or a thin paper such as inorganic fiber paper having a whisker structure. A layer obtained by peeling a dried coating obtained by applying a coating liquid containing fibers and a binder may also be used as the fibrous porous layer 8.

The diameter of the fiber is generally 18 μm or less, preferably 1-10 μm, for reasons of proper tensile strength and proper ink passage through the fibrous layer 8. The length of the fiber is generally 0.1-2 mm for reasons of uniformity of the fibrous layer 8. The fibrous porous layer 8 preferably has a basis weight of 1-20 g/m$^2$, more preferably 3-10 g/m$^2$, for reasons of proper ink permeability and tensile strength. The fibrous porous layer 8 may be a paper obtained by wet papermaking of short fibers such as natural fibers, synthetic fibers and mixtures thereof, a non-woven fabric, a woven fabric or a screen gauze. The fibrous porous layer 8 may be a laminate of two or more fibrous layers or may be overlaid with a porous resin layer.

The fibrous porous layer 8 may be laminated on the porous resin layer 4 with an adhesive. It is preferred that the amount and the viscosity of the adhesive applied to the porous resin layer 4 and/or fibrous porous layer 8 be controlled so as to prevent the adhesive from entering the openings of the porous resin layer 4.

The fibrous porous layer 8 preferably has a lower tensile strength and/or a lower stiffness than those of the porous reinforcing layer 7. Generally, the fibrous porous layer 8 has a tensile strength of 30-380 N/m. The stiffness of the fibrous porous layer 8 is generally 4-40 mN in terms of flexural rigidity.

In use, the stencil is heated imagewise by, for example, a thermal head to perforate the heated portions of the thermoplastic resin film 1, thereby obtaining a printing master for reproducing images by mimeographic printing. In this case, it is preferred that the stencil be provided with imagewise perforations 5 (FIG. 3) each having an area of at least D μm determined by the following equation:

$$D = (61-Y)/0.0063$$

wherein Y is (AO/AS)×100% where AS represents a total area of a surface of the porous resin layer 4 and AO represents a total area of openings of the porous resin layer 4 exposed to the surface of the porous resin layer 4. Y is preferably less than 61% for reasons of prevention of backside stains.

Stated otherwise, the stencil master obtained from the heat-sensitive stencil of the present invention is preferably provided with imagewise perforations 5 each having an area of at least D µm, wherein the porous resin layer 4 has pores 3 exposed to a surface thereof to form a multiplicity of openings, wherein the total area of the openings is Y % of a total area of the surface, and wherein D and Y have the following relationship:

$$D=(61-Y)/0.0063.$$

The following examples will further illustrate the present invention. Parts and percentages are by weight. Softening points of resins were measured using thermal stress strain measuring apparatus TMA/SS150C (Seiko Electric Industry Co., Ltd).

EXAMPLE 1

| | |
|---|---|
| Cellulose acetate butylate (softening point: 131° C., CAB381-20 manufactured by Eastman Kodak Inc.) | 5 parts |
| Methyl ethyl ketone (b.p. 79.6° C.) | 85 parts |
| Water (b.p. 100.0° C.) | 5 parts |
| Methanol (b.p. 64.5° C.) | 5 parts |

The above composition was stirred to dissolve the resin in the solvent and allowed to quiescently stand to remove foams. The solution was then uniformly applied to a biaxially stretched polyester film (thickness: 3.5 µm) with a wire bar (diameter: 0.6 mm) at a temperature of 30° C. and a relative humidity of 50%, thereby to form a wet coating. This was allowed to stand as such for 1 minute and then placed in a drying chamber at 50° C. for 2 minutes to dry the coating. The dried coating was a porous resin layer. A liquid containing a silicone resin and a cationic antistatic agent was applied on the back side of the polyester film opposite the porous layer and dried to form a stick preventing layer having a deposition amount of 0.05 g/m². A polyester (Tetlon) screen of 355 mesh was then bonded to the porous resin layer with a polyethylene adhesive (applied in an amount of 3 g/m²), thereby obtaining a stencil according to the present invention.

EXAMPLE 2

| | |
|---|---|
| Cellulose acetate butylate (softening point: 131° C.) | 5 parts |
| Methyl ethyl ketone (b.p. 79.6° C.) | 60 parts |
| Water (b.p. 100.0° C.) | 30 parts |
| Methanol (b.p. 64.5° C.) | 5 parts |

Example 1 was repeated in the same manner as described except that the above composition was substituted for the composition used in Example 1 for the formation of the porous resin layer.

EXAMPLE 3

| | |
|---|---|
| Cellulose acetate butylate (softening point: 131° C.) | 5 parts |
| Methyl ethyl ketone (b.p. 79.6° C.) | 85 parts |
| Water (b.p. 100.0° C.) | 5 parts |
| Methanol (b.p. 64.5° C.) | 5 parts |

The above composition was stirred to dissolve the resin in the solvent and allowed to quiescently stand to remove foams. The solution was then uniformly applied to a biaxially stretched polyester film (thickness: 3.5 µm) with a wire bar (diameter: 0.6 mm) at a temperature of 30° C. and a relative humidity of 50%, thereby to form a wet coating. Fine droplets of water were sprayed for 15 seconds from Humidiffer UV-107D (manufactured by Hitachi Inc.) over the surface of the wet coating placed at a distance 10 cm away from the Humidiffer. This was allowed to stand as such for 1 minute and then placed in a drying chamber at 50° C. for 2 minutes to dry the coating and to obtain a porous resin layer. In the same manner as that in Example 1, a stick preventing layer was formed on the polyester film and a polyethylene screen was bonded to the porous resin layer.

EXAMPLE 4

| | |
|---|---|
| Vinyl chloride-vinyl acetate copolymer (VYHH manufactured by Union Carbide Inc. softening point: 78° C.) | 3 parts |
| Acetone (b.p. 56.1° C.) | 20 parts |
| Ethanol (b.p. 78.3° C.) | 8 parts |

The above composition was stirred to dissolve the resin in the solvent and allowed to quiescently stand to remove foams. The solution was then uniformly applied to a biaxially stretched polyester film (thickness: 3.5 µm) with a wire bar (diameter: 1.0 mm) at a temperature of 20° C. and a relative humidity of 50%, thereby to form a wet coating. This was placed in a drying chamber at 50° C. for 2 minutes to dry the coating. The dried coating was a porous resin layer. Then, in the same manner as that in Example 1, a stick preventing layer was formed on the polyester film and a polyethylene screen was bonded to the porous resin layer.

EXAMPLE 5

Example 4 was repeated in the same manner as described except that a biaxially stretched polyester film (thickness: 1.5 µm) was substituted for the 3.5 µm thick biaxially stretched polyester film.

EXAMPLE 6

| | |
|---|---|
| Vinyl chloride-vinyl acetate copolymer (VAGD manufactured by Union Carbide Inc.) softening point: 83° C.) | 3 parts |
| Methyl ethyl ketone (b.p. 79.6° C.) | 17 parts |
| Methanol (b.p. 64.5° C.) | 9 parts |

Example 4 was repeated in the same manner as described except that the above composition was substituted for the composition used in Example 4 for the preparation of the porous resin layer.

EXAMPLE 7

| | |
|---|---|
| Cellulose acetate butylate (softening point: 131° C.) | 3 parts |
| Acetone (b.p. 56.1° C.) | 18 parts |
| Water (b.p. 100.0° C.) | 5 parts |
| Silica powder | 0.3 part |

Example 4 was repeated in the same manner as described except that the above composition was substituted for the composition used in Example 4 for the preparation of the porous resin layer.

EXAMPLE 8

| | |
|---|---|
| Poly(vinyl butyral) (PVB3000-2 manufactured by Denki Kagaku Kogyo K. K., softening point: 87° C.) | 8 parts |
| Ethanol (b.p. 78.3° C.) | 69 parts |
| Water (b.p. 100.0° C.) | 23 parts |
| Acrylic acid-styrene copolymer (softening point: 65° C., J679 manufactured by Johnson Polymer Inc.) | 1.2 parts |

The above composition was dissolved with stirring and mixed and dispersed with 1.6 parts titanium oxide (rutile) using a ball mill. Example 4 was then repeated in the same manner as described except that the above dispersion was substituted for the composition used in Example 4 for the preparation of the porous resin layer.

COMPARATIVE EXAMPLE 1

Example 2 was repeated in the same manner as described except that the polyester screen was not bonded.

COMPARATIVE EXAMPLE 2

In the same manner as described in Example 2, a porous resin layer was formed on a polyester film. Then, a fibrous porous layer was formed on the porous resin layer as follows.

| | |
|---|---|
| Vinyl chloride-vinyl acetate copolymer (VYHH manufactured by Union Carbide Inc. softening point: 78° C.) | 1 part |
| Polyester fiber (0.15 denier, diameter: 4 μm, specific gravity: 1.4, manufactured by Teijin Inc.) | 2 parts |
| Ethyl acetate | 8 parts |

The above composition was dispersed with a ball mill. The dispersion was coated on a polyester film having a thickness of 1.5 μm using a roll coater and dried at 50° C. to obtain a fibrous porous layer having a deposition amount of 3.5 g/cm$^2$ (on dry basis). The fibrous porous layer was peeled from the polyester film and laminated on the porous resin layer using a polyethylene adhesive (applied in an amount of 3 g/m$^2$) thereby obtaining a comparative stencil having no water soluble resin layer.

Each of the thus obtained heat-sensitive stencils was measured for average pore diameter of the porous resin layer, density of the porous resin layer, open degree OD1 (which is defined as a percentage of a total area of the openings of the porous resin layer having an equivalent diameter of at least 5 μm based on a total area of the surface of the porous resin layer), open degree OD2 (which is defined as a percentage of a total area of the openings of the porous resin layer having an equivalent diameter of at least 5 μm based on a total area of the openings of the porous resin layer), bonding strength, flexural rigidity, perforation sensitivity, elongation, print quality, backside stains and print density. The average pore diameter, open degree OD1, open degree OD2 and flexural rigidity were measured by the methods described previously.

The bonding strength, perforation sensitivity, elongation, print quality, backside stains and print density were measured using PRIPORT VT 3820 (manufactured by Ricoh Company Ltd.; provided with a thermal head manufactured by Toshiba Inc.) and its associated ink (TV600 II, lot NO. 960604-22) The printing was performed at 20° C. under a relative humidity of 60% with an applied pulse width of higher by 7% than the standard at three different printing speeds.

The bonding strength between the thermoplastic resin film and the porous resin layer is measured by perforating a sample stencil with a thermal head to see whether or not the support is separated from the thermoplastic resin film. Evaluation is made according to the following ratings:

A: no separation
B: slight separation
C: significant separation

The perforation sensitivity was evaluated according to the following ratings:

A: all perforations are properly formed
B: part of perforations have small diameters
C: perforations are partly failed
D: most of perforations are failed The elongation of the stencil was measured after 300 prints had been produced and evaluated by the following ratings:

A: no elongation of the stencil is found
B: elongation of the stencil is found

The print image quality was evaluated with respect to blurs and variation of density. Evaluation was made by comparison with the image obtained using a commercial stencil (VT2 Master manufactured by Ricoh Company Ltd.) and rated as follows:

A: better
B: comparable
C: inferior

The backside stain (offset) is an undesirable phenomenon of transference of an ink in a stacked prints from one print to adjacent print. Evaluation was made by comparison with the image obtained using a commercial stencil (VT2 Master manufactured by Ricoh Company Ltd.) and rated as follows:

A: better
B: comparable
C: inferior

The print density of the 20th print from the initiation of printing was measured using McBeath densimeter RD914.

The results are summarized in Table 2.

TABLE 2

| Example | Porous Resin Layer | | | | Stencil | |
|---|---|---|---|---|---|---|
| | Average pore diameter (μm) | Density (g/cm³) | Open degree OD1 (%) | Open degree OD2 (%) | Thickness (μm) | Flexural Rigidity (mN) |
| 1 | 10 | 0.8 | 60 | 93 | 45 | 195 |
| 2 | 12 | 0.5 | 65 | 96 | 46 | 209 |
| 3 | 15 | 0.6 | 75 | 98 | 47 | 217 |
| 4 | 8 | 0.3 | 40 | 93 | 54 | 194 |
| 5 | 8 | 0.3 | 40 | 93 | 52 | 198 |
| 6 | 18 | 0.5 | 38 | 95 | 55 | 211 |
| 7 | 1.7 | 0.5 | 7 | 51 | 44 | 195 |
| 8 | 3.2 | 0.7 | 12 | 80 | 50 | 205 |
| Comp. 1 | 12 | 0.5 | 65 | 96 | 12 | 11 |
| Comp. 2 | 12 | 0.5 | 65 | 96 | 42 | 72 |

| Example | Stencil | | | Properties of Print | | |
|---|---|---|---|---|---|---|
| | Bonding strength | Perforation sensitivity | Elongation | Image quality | Backside Stains | Image density |
| 1 | A | B | B | B | B | 0.97 |
| 2 | A | A | A | A | A | 1.05 |
| 3 | A | A | A | B | B | 1.01 |
| 4 | B | A | A | A | A | 1.12 |
| 5 | B | A | A | A | A | 1.22 |
| 6 | A | A | A | A | A | 1.08 |
| 7 | B | B | A | B | A | 0.81 |
| 8 | A | A | A | A | A | 1.10 |
| Comp. 1 | A | A | D | A | A | 1.05 |
| Comp. 2 | A | A | B | D | A | 1.05 |

EXAMPLE 9

| | |
|---|---|
| Poly(vinyl butyral) (PVB3000-2 manufactured by Denki Kagaku Kogyo K. K., softening point: 87° C.) | 4 parts |
| Ethanol (b.p. 78.3° C.) | 35.5 parts |
| Water (b.p. 100.0° C.) | 11.5 parts |

Figure 5:
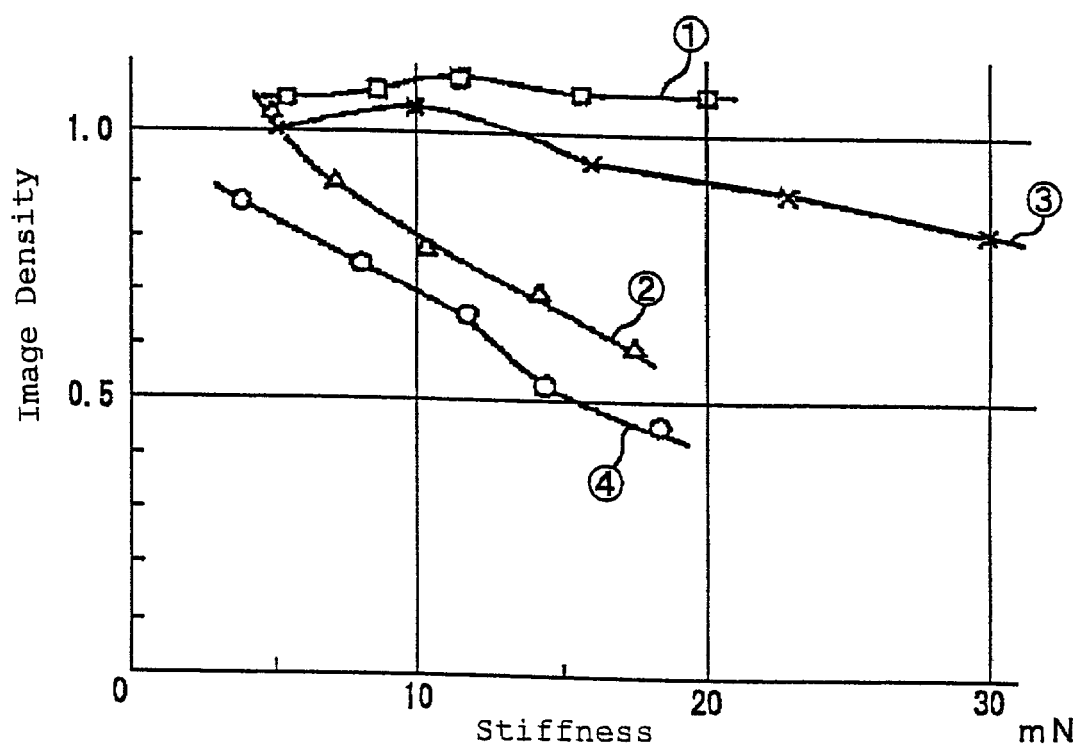
FIG. 5 is a graph showing a relationship between image density and flexural rigidity of heat-sensitive stencils according to the present invention.

The above composition was dissolved with stirring and mixed and dispersed with 0.8 part of needle-like magnesium silicate using a ball mill. The dispersion was then uniformly applied to a biaxially stretched polyester film (thickness: 3.5 μm) with a wire bar (diameter: 0.6 mm) to form a wet coating. This was immediately placed in a drying chamber at 50° C. for 3 minutes to dry the coating and to obtain a porous resin layer. On the thus obtained porous resin layer, a porous reinforcing layer is formed in the same manner as that in Example 1. The thus obtained stencil had an air permeability of 62 cm³/cm²·sec. The above procedures were repeated in the same manner as described except that various wire bars having diameters of 0.8 mm, 1.0 mm, 1.2 mm and 1.4 mm were used in place of the 0.6 mm wire bar, thereby obtaining stencils having air permeability (measured by the method described above) of 57, 53, 48 and 39 cm³/cm²·sec, respectively. Each of the stencils was found to have an open degree OD1 in the range of 35-43% and to give prints having high image density and free of backside stains. The relationship between the flexural rigidity and the image density of the above stencils is shown by the curve ① in FIG. 5.

EXAMPLE 10

| | |
|---|---|
| Poly (vinyl butyral) (PVB3000-2 manufactured by Denki Kagaku Kogyo K. K., softening point: 87° C.) | 4 parts |
| Ethanol (b.p. 78.3° C.) | 35.5 parts |
| Water (b.p. 100.0° C.) | 11.5 parts |

Using the above composition, a porous resin layer was formed in the same manner as described in Example 4. On the thus obtained porous resin layer, a porous reinforcing layer was formed in the same manner as that in Example 4. The above procedures were repeated using various wire bars, thereby obtaining stencils having air permeability of 31, 26, 21 and 17 cm³/cm²·sec. Each of the stencils was found to have an open degree OD1 in the range of 33-40%. The relationship between the flexural rigidity and the image density of the above stencils is shown by the curve ② in FIG. 5. As seen from the comparison of curves ① and ②, the image density of the stencils containing a filler in the porous resin layer remains unchanged when the flexural rigidity increases (curve ①). In the absence of the filler, the image density decreases with an increase of the rigidity (curve ②) because of a decrease of the air permeability.

EXAMPLE 11

| | |
|---|---|
| Poly (vinyl acetal) | 2 parts |
| Ethanol | 18 parts |
| Water | 3 parts |

The above composition was dissolved with stirring and mixed and dispersed with 0.4 part of plate-like magnesium silicate (talc, Microace P4 manufactured by Nippon Talc Inc.) using a ball mill. The dispersion was then uniformly applied to a biaxially stretched polyester film (thickness: 1.5 μm) with a wire bar to form a wet coating. This was immediately placed in a drying chamber at 50° C. for 3 minutes to dry the coating and to obtain a porous resin layer. On the thus obtained porous resin layer, a porous reinforcing layer was formed in the same manner as that in Example 1. The above procedures were repeated using wire bars having various diameters, thereby obtaining stencils having air permeability of 60, 56, 54, 46 and 37 cm³/cm²·sec. Each of the stencils was found to have an open degree OD1 in the range of 65-76%. The relationship between the flexural rigidity and the image density of the above stencils is shown by the curve ③ in FIG. 5.

EXAMPLE 12

| | |
|---|---|
| Poly (vinyl acetal) | 2 parts |
| Ethanol | 18 parts |
| Water | 3 parts |

Using the above composition, a porous resin layer was formed in the same manner as described in Example 4. On the thus obtained porous resin layer, a porous reinforcing layer was formed in the same manner as that in Example 1.

The above procedures were repeated using wire bars having various diameters, thereby obtaining stencils having air permeability of 54, 39, 28, 19 and 12 cm³/cm²·sec. Each of the stencils was found to have an open degree OD1 in the range of 61-72%. The relationship between the flexural rigidity and the image density of the above stencils is shown by the curve ④ in FIG. 5. As seen from the comparison of curves ③ and ④, the image density of the stencils containing a filler in the porous resin layer remains unchanged when the flexural rigidity increases (curve ③). In the absence of the filler, the image density decreases with an increase of the rigidity (curve ④) because of a decrease of the air permeability.

EXAMPLE 13

Polycarbonate (2 parts) was dissolved in a mixed solvent containing 28 parts of tetrahydrofran and 3.8 parts of ethanol, to which 1.1 parts of polyvinyl butyral (serving as an adhesion improver for a porous resin layer and a thermoplastic resin film) was further dissolved. 5 parts of potassium titanate whiskers (Tofica Y manufactured by Otsuka Seiyaku Co., Ltd.) were then dispersed into the above resin solution using a ball mill to obtain a coating liquid. The coating liquid was then uniformly applied to a biaxially stretched polyester film (thickness: 3.5 μm) with a wire bar (diameter: 1.0 mm) and the wet coating was dried to form a porous resin layer. A porous reinforcing layer was then formed on the thus obtained porous resin layer in the same manner as that in Example 1. The porous resin layer of the thus obtained stencil had an open degree OD1 of 44%. The stencil had an air permeability of 142 cm³/cm²·sec, a flexural rigidity of 110 mN and gave prints having an image density of 1.05 and no backside stains.

EXAMPLES 14-19

| | |
|---|---|
| Polyvinyl acetal resin (Eslek KS-1 manufactured by Sekisui Kagaku Kogyo Co., Ltd.) | 3.2 parts |
| Talc (Microace L-G manufactured by Nippon talc Inc.) | 2.4 parts |
| Sorbitan fatty acid ester (SO-10 manufactured by Nikko Chemicals Inc.) | 0.1 part |
| Modified silicone oil (KF6012 manufactured by Shinetsu Kagaku Kogyo Co., Ltd.) | 0.1 part |
| Acrylic polymer o/w emulsion (Joncryl-711 manufactured by Johnson Polymer Inc.) | 0.2 part |

The above composition was dissolved and dispersed in ethyl acetate, to which 1% aqueous solution of hydroxyethyl cellulose was added in an amount one part per 1.5 parts of the ethyl acetate to form a coating liquid. The amount of the ethyl acetate was varied so as to provide 6 kinds of the coating liquids having various solid matter contents and viscosities as shown in Table 3. Each of the coating liquids was applied to a biaxially stretched polyester film (thickness: 2 μm) with a die head at 20° C. and a relative humidity of 50% to form a wet coating. This was then placed in a drying chamber at 50° C. and a relative humidity of 50% to dry the coating and to obtain a porous resin layer having a total deposition amount of 6 g/m². The porous resin layer was measured for its total area of openings. On the thus obtained porous resin layer, a porous reinforcing layer was formed in the same manner as that in Example 1.

| | |
|---|---|
| Silicone oil (SF8422 manufactured by Shinetsu Kagaku Kogyo Co., Ltd.) | 0.5 part |
| Surfactant (Plysurf A208 manufactured by Daiichi Kogyo Seiyaku Inc.) | 0.5 part |
| Toluene | 100 parts |

The liquid containing a silicone resin and a cationic antistatic agent was applied on the back side of the polyester film opposite the porous resin layer of each of the 6 stencils and dried to form a stick preventing layer having a deposition amount of 0.05 g/m².

The resulting stencils were then perforated to form masters and tested for printing quality using 3 printers giving different area (D μm²) of perforations, i.e. PRIPORT JP1300 (manufactured by Ricoh Company Ltd.; perforation area D: 3700 μm²), JP5050 (manufactured by Ricoh Company Ltd.; perforation area D: 2400 μm²) and VT6000 (manufactured by Ricoh Company Ltd.; perforation area D: 300 μm²). The image quality of the 10th print from the initiation of printing was evaluated with respect to white spots according to the following ratings:

A: no white spots (excellent quality)
B: slight white spots (no good)
C: significant white spots (bad)

The results are summarized in Table 3.

TABLE 3

| | Coating Liquid | | Porous Resin Layer | Image Quality | | |
|---|---|---|---|---|---|---|
| Example | Solid Matter Content (%) | Viscosity (cP) | Degree of Opening Y (%) | D = 3700 JP1300 | D = 2400 JP5050 | D = 300 VT6000 |
| 14 | 4.0 | 50 | 82 | A | A | A |
| 15 | 4.5 | 100 | 67 | A | A | A |
| 16 | 5.0 | 200 | 58 | A | A | A |
| 17 | 6.0 | 500 | 46 | A | A | B |
| 18 | 7.5 | 500 | 39 | A | B | B |
| 19 | 10.0 | 1500 | 27 | B | B | B |

The degree of opening Y and the diameter of each perforation D are measured as follows.

Degree of Opening Y (%):

Degree of opening Y is a percentage of a total area of the openings at a surface of the porous resin layer based on the area of the surface. The total area of the openings may be measured as follows. A photomicrograph of a sample stencil is taken from the thermoplastic resin film side using a photomicroscope (OLYMPUS BX60 manufactured by Olympus Corporation, magnification ×200, irradiation with a reflected light, level: 9, with use of a deflection filter, focused on the porous resin layer) and is converted into a computer image. The image is binarized using an image processing software "WinROOF" (manufactured by Mitsutani Shoji Co., Ltd.) by converting the image into gray image, converting the concentration (default), automatic binarization (P tile method, default), filling, deletion (less than 100) and measurement (shape characteristics, area). The photomicrograph is taken before the water soluble resin layer and the fibrous porous layer are laminated on the porous resin layer.

Area of Perforation:

The area of an opening may be measured as follows. A photomicrograph of a sample perforated stencil is taken using a photomicroscope (OLYMPUS BX60 manufactured by Olympus Corporation, magnification ×200, irradiation with a reflected light, level: 9, with use of a deflection filter, focused on the porous resin layer) and is converted into a computer image. The image is binarized using an image processing software "WinROOF" (manufactured by Mitsutani Shoji Co., Ltd.) by converting the image into gray image, converting the concentration (default), automatic binarization (P tile method, default), filling, deletion (less than 500) and measurement (shape characteristics, area).

EXAMPLE 20

| Cellulose acetate butylate (softening point: 131° C., CAB381-20 manufactured by Eastman Kodak Inc.) | 5 parts |
| --- | --- |
| Methyl ethyl ketone (b.p. 79.6° C.) | 85 parts |
| Water (b.p. 100.0° C.) | 5 parts |
| Methanol (b.p. 64.5° C.) | 5 parts |

The above composition was stirred to dissolve the resin in the solvent and allowed to quiescently stand to remove foams. The solution was then uniformly applied to a biaxially stretched polyester film (thickness: 3.5 μm) with a wire bar (diameter: 0.6 mm) at a temperature of 30° C. and a relative humidity of 50%, thereby to form a wet coating. This was allowed to stand as such for 1 minute and then placed in a drying chamber at 50° C. for 2 minutes to dry the coating. The dried coating was a porous resin layer. A liquid containing a silicone resin and a cationic antistatic agent was applied on the back side of the polyester film opposite the porous layer and dried to form a stick preventing layer having a deposition amount of 0.05 g/m².

| Vinyl chloride-vinyl acetate copolymer (VYHH manufactured by Union Carbide Inc.) | 1 part |
| --- | --- |
| Polyester fiber (0.15 denier, diameter: 4 μm, specific gravity: 1.4, manufactured by Teijin Inc.) | 0.8 parts |
| Ethyl acetate | 8 parts |

The above composition was dispersed with a ball mill. The dispersion was coated on a polyester film having a thickness of 1.5 μm using a roll coater and dried at 50° C. to obtain a fibrous porous layer having a deposition amount of 3.5 g/cm² (on dry basis). The fibrous porous layer was peeled from the polyester film and laminated on the above porous resin layer using a polyethylene adhesive (applied in an amount of 3 g/m²). Further, a thin paper as a porous reinforcing layer (fiber diameter: 20-25 μm) obtained by paper making and used as a substrate for a heat sensitive stencil (VT II master) for a stencil printer PRIPORT VT3820 (manufactured by Ricoh Company Ltd.) was laminated on the above fibrous porous layer using a polyethylene adhesive (applied in an amount of 3 g/m²), thereby obtaining a stencil according to the present invention.

EXAMPLE 21

| Cellulose acetate butylate (softening point: 131° C.) | 5 parts |
| --- | --- |
| Methyl ethyl ketone (b.p. 79.6° C.) | 60 parts |
| Water (b.p. 100.0° C.) | 30 parts |
| Methanol (b.p. 64.5° C.) | 5 parts |

Example 20 was repeated in the same manner as described except that the above composition was substituted for the composition used in Example 20 for the formation of the porous resin layer.

EXAMPLE 22

| Cellulose acetate butylate (softening point: 131° C.) | 5 parts |
| --- | --- |
| Methyl ethyl ketone (b.p. 79.6° C.) | 85 parts |
| Water (b.p. 100.0° C.) | 5 parts |
| Methanol (b.p. 64.5° C.) | 5 parts |

The above composition was stirred to dissolve the resin in the solvent and allowed to quiescently stand to remove foams. The solution was then uniformly applied to a biaxially stretched polyester film (thickness: 3.5 μm) with a wire bar (diameter: 0.6 mm) at a temperature of 30° C. and a relative humidity of 50%, thereby to form a wet coating. Fine droplets of water were sprayed for 15 seconds from Humidiffer UV-107D (manufactured by Hitachi Inc.) over the surface of the wet coating placed at a distance 10 cm away from the Humidiffer. This was allowed to stand as such for 1 minute and then placed in a drying chamber at 50° C. for 2 minutes to dry the coating and to obtain a porous resin layer. After a stick preventing layer had been formed on the polyester film in the same manner as described in Example 20, a fibrous porous layer and a porous reinforcing layer were laminated on the porous resin layer in the same manner as that in Example 20.

EXAMPLE 23

| Vinyl chloride-vinyl acetate copolymer (VYHH manufactured by Union Carbide Inc. softening point: 78° C.) | 3 parts |
| --- | --- |
| Acetone (b.p. 56.1° C.) | 20 parts |
| Ethanol (b.p. 78.3° C.) | 8 parts |

The above composition was stirred to dissolve the resin in the solvent and allowed to quiescently stand to remove foams. The solution was then uniformly applied to a biaxially stretched polyester film (thickness: 3.5 μm) with a wire bar (diameter: 1.0 mm) at a temperature of 20° C. and a relative humidity of 50%, thereby to form a wet coating. This was placed in a drying chamber at 50° C. for 2 minutes to dry the coating. The dried coating was a porous reinforcing layer. After a stick preventing layer was formed on the polyester film in the same manner as described in Example 20, a fibrous porous reinforcing layer and a porous reinforcing layer were laminated on the porous resin layer in the same manner as that in Example 20.

EXAMPLE 24

Example 23 was repeated in the same manner as described except that a biaxially stretched polyester film (thickness: 1.5 μm) was substituted for the 3.5 μm thick biaxially stretched polyester film.

EXAMPLE 25

| | |
|---|---|
| Vinyl chloride-vinyl acetate copolymer (VAGD manufactured by Union Carbide Inc.) softening point: 83° C.) | 3 parts |
| Methyl ethyl ketone (b.p. 79.6° C.) | 17 parts |
| Methanol (b.p. 64.5° C.) | 9 parts |

Example 23 was repeated in the same manner as described except that the above composition was substituted for the composition used in Example 23 for the preparation of the porous resin layer.

EXAMPLE 26

| | |
|---|---|
| Cellulose acetate butylate (softening point: 131° C.) | 3 parts |
| Acetone (b.p. 56.1° C.) | 18 parts |
| Water (b.p. 100.0° C.) | 5 parts |
| Silica powder | 0.3 part |

Example 23 was repeated in the same manner as described except that the above composition was substituted for the composition used in Example 23 for the preparation of the porous resin layer.

EXAMPLE 27

| | |
|---|---|
| Poly (vinyl butyral) (PVB3000-2 manufactured by Denki Kagaku Kogyo K. K., softening point: 87° C.) | 8 parts |
| Ethanol (b.p. 78.3° C.) | 69 parts |
| Water (b.p. 100.0° C.) | 23 parts |
| Acrylic acid-styrene copolymer (softening point: 65° C., J679 manufactured by Johnson Polymer Inc.) | 1.2 part |

The above composition was dissolved with stirring and mixed and dispersed with 1.6 parts titanium oxide (rutile) using a ball mill. Example 23 was then repeated in the same manner as described except that the above dispersion was substituted for the composition used in Example 23 for the preparation of the porous resin layer.

Each of the thus obtained heat-sensitive stencils was measured for average pore diameter of the porous resin layer, density of the porous resin layer, open degree OD1 (which is defined as a percentage of a total area of the openings of the porous resin layer having an equivalent diameter of at least 5 μm based on a total area of the surface of the porous resin layer), open degree OD2 (which is defined as a percentage of a total area of the openings of the porous resin layer having an equivalent diameter of at least 5 μm based on a total area of the openings of the porous resin layer), bonding strength, flexural rigidity, perforation sensitivity, elongation, print quality, backside stains and print density. The average pore diameter, open degree OD1, open degree OD2 and flexural rigidity were measured by the methods described previously.

The bonding strength, perforation sensitivity, elongation, print quality, backside stains and print density were measured using PRIPORT VT 3820 (manufactured by Ricoh Company Ltd.; provided with a thermal head manufactured by Toshiba Inc.).

The bonding strength between the thermoplastic resin film and the porous resin layer is measured by perforating a sample stencil with a thermal head to see whether or not the support is separated from the thermoplastic resin film. Evaluation is made according to the following ratings:

A: no separation
B: slight separation
C: significant separation

The perforation sensitivity was evaluated according to the following ratings:

A: all perforations are properly formed
B: part of perforations have small diameters
C: perforations are partly failed
D: most of perforations are failed The elongation of the stencil was measured after 300 prints had been produced and evaluated by the following ratings:

A: no elongation of the stencil is found
B: elongation of the stencil is found

The print image quality was evaluated with respect to blurs and variation of density. Evaluation was made by comparison with the image obtained using a commercial stencil (VT2 Master manufactured by Ricoh Company Ltd.) and rated as follows:

A: better
B: comparable
C: inferior

The backside stain (offset) is an undesirable phenomenon of transference of an ink in a stacked prints from one print to adjacent print. Evaluation was made by comparison with the image obtained using a commercial stencil (VT2 Master manufactured by Ricoh Company Ltd.) and rated as follows:

A: better
B: comparable
C: inferior

The print density of the 20th print from the initiation of printing was measured using McBeath densimeter RD914. The results are summarized in Table 4.

TABLE 4

| | Porous Resin Layer | | | | Stencil | |
|---|---|---|---|---|---|---|
| Example | Average pore diameter (μm) | Density (g/cm3) | Open degree OD1 (%) | Open degree OD2 (%) | Thickness (μm) | Flexural Rigidity (mN) |
| 20 | 10 | 0.8 | 60 | 93 | 43 | 170 |
| 21 | 12 | 0.5 | 65 | 96 | 45 | 164 |
| 22 | 15 | 0.6 | 75 | 98 | 46 | 170 |
| 24 | 8 | 0.3 | 40 | 93 | 50 | 155 |
| 23 | 8 | 0.3 | 40 | 93 | 52 | 152 |
| 25 | 18 | 0.5 | 38 | 95 | 53 | 165 |
| 26 | 1.7 | 0.5 | 7 | 51 | 42 | 153 |
| 27 | 3.2 | 0.7 | 12 | 80 | 481 | 161 |

TABLE 4-continued

| | Stencil | | | | | |
|---|---|---|---|---|---|---|
| | | Perfora-tion | | Properties of Print | | |
| Example | Bonding strength | sensi-tivity | Elonga-tion | Image quality | Back-side Stains | Image density |
| 20 | A | B | A | B | B | 0.97 |
| 21 | A | A | A | A | A | 1.05 |
| 22 | A | A | A | B | B | 1.01 |
| 23 | B | A | A | A | A | 1.12 |
| 24 | B | A | A | A | A | 1.22 |
| 25 | A | A | A | A | A | 1.08 |
| 26 | B | B | A | B | A | 0.81 |
| 27 | A | A | A | A | A | 1.10 |

EXAMPLE 28

Polycarbonate (2 parts) was dissolved in a mixed solvent containing 28 parts of tetrahydrofran and 3.8 parts of ethanol, to which 1.1 parts of polyvinyl butyral (serving as an adhesion improver for a porous resin layer and a thermoplastic resin film) was further dissolved. 5 parts of potassium titanate whiskers (Tofica Y manufactured by Otsuka Seiyaku Co., Ltd.) were then dispersed into the above resin solution using a ball mill to obtain a coating liquid. The coating liquid was then uniformly applied to a biaxially stretched polyester film (thickness: 3.5 μm) with a wire bar (diameter: 1.0 mm) and the wet coating was dried to form a porous resin layer. After a stick preventing layer had been formed on the polyester film in the same manner as described in Example 20, a fibrous porous reinforcing layer and a porous reinforcing layer were laminated on the porous resin layer in the same manner as that in Example 20. The porous resin layer of the thus obtained stencil had an open degree OD1 of 44%. The stencil had an air permeability of 142 cm$^3$/cm$^2$·sec, a flexural rigidity of 110 mN and gave prints having an image density of 1.05 and no backside stains.

EXAMPLE 29

Example 20 was repeated in the same manner as described except that the solution for the formation of the porous resin layer was applied at a temperature of 23° C. and under a relative humidity of 30%.

EXAMPLE 30

Example 20 was repeated in the same manner as described except that the solution for the formation of the porous resin layer was applied at a temperature of 23° C. and under a relative humidity of 90%.

EXAMPLES 31-36

| | |
|---|---|
| Polyvinyl acetal resin (Eslek KS-1 manufactured by Sekisui Kagaku Kogyo Co., Ltd.) | 3.2 parts |
| Talc (Microace L-G manufactured by Nippon talc Inc.) | 2.4 parts |
| Sorbitan fatty acid ester (SO-10 manufactured by Nikko Chemicals Inc.) | 0.1 part |
| Modified silicone oil (KF6012 manufactured by Shinetsu Kagaku Kogyo Co., Ltd.) | 0.1 part |
| Acrylic polymer o/w emulsion (Joncryl-711 manufactured by Johnson Polymer Inc.) | 0.2 part |

The above composition was dissolved and dispersed in ethyl acetate, to which 1% aqueous solution of hydroxyethyl cellulose was added in an amount one part per 1.5 parts of the ethyl acetate to form a coating liquid. The amount of the ethyl acetate was varied so as to provide 6 kinds of the coating liquids having various solid matter contents and viscosities as shown in Table 3. Each of the coating liquids was applied to a biaxially stretched polyester film (thickness: 2 μm) with a die head at 20° C. and a relative humidity of 50% to form a wet coating. This was then placed in a drying chamber at 50° C. and a relative humidity of 50% to dry the coating and to simultaneously obtain a porous resin layer and a thin resin layer having a total deposition amount of 6 g/m$^2$. The thin resin layer had a thickness of about 0.4 μm. The porous resin layer was measured for its total area of openings. On the thus obtained porous resin layer, a fibrous porous layer and a porous reinforcing layer were laminated in the same manner as that in Example 20 and, thereafter, a stick preventing layer was formed on the polyester film in the same manner as described in Example 20.

The resulting stencils were then perforated to form masters and tested for printing quality using 3 printers in the same manner as that in Example 14. The results are summarized in Table 5.

TABLE 5

| | Coating Liquid | | Porous Resin Layer | | | |
|---|---|---|---|---|---|---|
| | Solid Matter | Vis- | Degree of Opening | Image Quality | | |
| Example | Content (%) | cosity (cP) | Y (%) | D = 3700 JP1300 | D = 2400 JP5050 | D = 300 VT6000 |
| 31 | 4.0 | 50 | 82 | A | A | A |
| 32 | 4.5 | 100 | 67 | A | A | A |
| 33 | 5.0 | 200 | 58 | A | A | A |
| 34 | 6.0 | 500 | 46 | A | A | B |
| 35 | 7.5 | 500 | 39 | A | B | B |
| 36 | 10.0 | 1500 | 27 | B | B | B |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A heat-sensitive stencil comprising:
   a thermoplastic resin film,
   a porous resin layer provided on said thermoplastic resin film, and
   one or more porous reinforcing layers having a tensile strength of at least 385 N/m, wherein the one or more porous reinforcing layers are provided on a side of said porous resin layer which is opposite to the thermoplastic resin film, and wherein at least one of said porous reinforcing layers is a fibrous layer formed from fibers having a diameter at least 21 μm.

2. A heat-sensitive stencil as set forth in claim 1, wherein at least one of said porous reinforcing layers is a layer of a mesh screen.

3. A heat-sensitive stencil as set forth in claim 1, wherein at least one of said porous reinforcing layers is a resin layer obtained by printing or coating.

4. A heat-sensitive stencil as set forth in claim 2, wherein said only one porous reinforcing layer is present.

5. A heat-sensitive stencil as set forth in claim 3, wherein said only one porous reinforcing layer is present.

6. A heat-sensitive stencil as set forth in claim 1, further comprising at least one fibrous porous layer provided between said porous resin layer and said porous reinforcing layers.

7. A heat-sensitive stencil as set forth in claim 6, wherein at least one of said porous reinforcing layers is a fibrous layer formed from a fiber having a diameter greater than the fiber of said fibrous porous layer.

8. A heat-sensitive stencil as set forth in claim 1, wherein said porous resin layer has pores exposed to a surface thereof to form a multiplicity of openings, and wherein the total area of said openings having an equivalent diameter of at least 5 μm is 4-80% of the area of said surface of said porous resin layer, said equivalent diameter being defined as a diameter of a circle having the same area as that of the corresponding opening.

9. A heat-sensitive stencil as set forth in claim 1, wherein said porous resin layer has pores exposed to a surface thereof to form a multiplicity of openings, wherein the total area of said openings having an equivalent diameter of at least 5 μm is at least 50% of a total area of said openings, said equivalent diameter being defined as a diameter of a circle having the same area as that of the corresponding opening.

10. A heat-sensitive stencil as set forth in claim 1, and providing air permeability of 1.0 $cm^3/cm^2 \cdot sec$ to 157 $cm^3/cm^2 \cdot sec$, when perforated to have an open ratio of at least 20%.

11. A heat-sensitive stencil as set forth in claim 1, and provided with imagewise perforations each having an area of at least D μm, wherein said porous resin layer has pores exposed to a surface thereof to form a multiplicity of openings, wherein the total area of said openings is Y % of a total area of said surface, and wherein D and Y have the following relationship:

$$D=(61-Y)/0.0063.$$

12. A method of preparing a printing master, comprising perforating a heat-sensitive stencil as set forth in claim 1 with part of said porous resin layer in each perforation remaining unremoved and covering the perforation.

13. A heat-sensitive stencil as set forth in claim 6, wherein said porous resin layer has pores exposed to a surface thereof to form a multiplicity of openings, and wherein the total area of said openings having an equivalent diameter of at least 5 μm is 4-80% of the area of said surface of said porous resin layer, said equivalent diameter being defined as a diameter of a circle having the same as that of the corresponding openings.

14. A heat-sensitive stencil as set forth in claim 6, wherein said porous resin layer has pores exposed to a surface thereof to form a multiplicity of openings, wherein the total area of said openings having an equivalent diameter of at least 5 μm is at least 50% of a total area of said openings, said equivalent diameter being defined as a diameter of a circle having the same area as that of the corresponding opening.

15. A heat-sensitive stencil as set forth in claim 6, and providing air permeability of 1.0 $cm^3/cm^2 \cdot sec$ to 157 $cm^3/cm^2 \cdot sec$, when perforated to have an open ratio of at least 20%.

16. A heat-sensitive stencil as set forth in claim 6, and provided with imagewise perforations each having an area of at least D μm, wherein said porous resin layer has pores exposed to a surface thereof to form a multiplicity of openings, wherein the total area of said openings is Y % of a total area of said surface, and wherein D and Y have the following relationship:

$$D=(61-Y)/0.0063.$$

17. A method of preparing a printing master, comprising perforating a heat-sensitive stencil as set forth in claim 6 with part of said porous resin layer in each perforation remaining unremoved and covering the perforation.

18. A stencil printer having a stencil as set forth in claim 1.

19. A stencil printer having a stencil as set forth in claim 6.

* * * * *